US008565690B2

(12) United States Patent
Suwansantisuk et al.

(10) Patent No.: US 8,565,690 B2
(45) Date of Patent: Oct. 22, 2013

(54) METHOD AND APPARATUS FOR SIGNAL SEARCHING

(75) Inventors: Watcharapan Suwansantisuk, Cambridge, MA (US); Moe Z. Win, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 697 days.

(21) Appl. No.: 11/983,787

(22) Filed: Nov. 8, 2007

(65) Prior Publication Data
US 2008/0139127 A1 Jun. 12, 2008

Related U.S. Application Data

(60) Provisional application No. 60/857,810, filed on Nov. 8, 2006.

(51) Int. Cl.
H04B 17/00 (2006.01)
(52) U.S. Cl.
USPC .................................. 455/67.16; 455/67.11
(58) Field of Classification Search
USPC ....................................................... 455/67.16
See application file for complete search history.

(56) References Cited

U.S. PATENT DOCUMENTS

| | | | | |
|---|---|---|---|---|
| 4,025,775 A | * | 5/1977 | Beauvais et al. | 708/5 |
| 4,447,910 A | * | 5/1984 | Smith et al. | 375/346 |
| 4,745,627 A | * | 5/1988 | Gubser | 329/302 |
| 6,097,768 A | * | 8/2000 | Janesch et al. | 375/330 |
| 6,763,057 B1 | * | 7/2004 | Fullerton et al. | 375/141 |
| 7,925,236 B2 | * | 4/2011 | Kawai | 455/295 |
| 2004/0101073 A1 | * | 5/2004 | Doi | 375/343 |
| 2004/0161064 A1 | * | 8/2004 | Brethour et al. | 375/347 |
| 2005/0134307 A1 | * | 6/2005 | Stojanovic et al. | 326/31 |
| 2007/0076822 A1 | * | 4/2007 | Miller et al. | 375/327 |
| 2007/0153875 A1 | * | 7/2007 | Lakkis et al. | 375/130 |
| 2007/0211786 A1 | * | 9/2007 | Shattil | 375/141 |
| 2008/0107162 A1 | * | 5/2008 | Moore et al. | 375/224 |
| 2009/0110033 A1 | * | 4/2009 | Shattil | 375/141 |

OTHER PUBLICATIONS

Zhang, Honglei et al., "Rapid Hybrid Acquisition of Ultra-Wideband Signals," *J. VLSI Sig. Proc.*: 43(1): 7-23 (2006).
Zhang, Honglei et al., "Rapid Acquisition of Ultra-Wideband Radio Signals," *IEEE*: 1 of 2 (36) 712-716 (2002).

(Continued)

*Primary Examiner* — Nay A Maung
*Assistant Examiner* — Erica Fleming-Hall
(74) *Attorney, Agent, or Firm* — Hamilton, Brook, Smith & Reynolds, P.C.

(57) ABSTRACT

A method and corresponding apparatus for searching for a signal is presented. The apparatus may be configured to select a first bin within a range of bins characterizing an uncertainty region. The bins may represent a phase within a bandwidth of interest. The apparatus may also be configured to compare a local signal, having a phase corresponding to the first bin, with a received signal, the received signal being received via a transmission medium. The apparatus may report whether the local signal matches the received signal. The apparatus may assign weightings to the bins if the local signal does not match the received signal. If a match is not found, the apparatus may select a next bin according to the weightings or according to characteristic of the transmission medium until a matching bin is obtained. One benefit of the search is reduced search time to allow, for example, a cell phone to synchronize the phase of a received signal more quickly than is currently done.

22 Claims, 12 Drawing Sheets

(56) References Cited

OTHER PUBLICATIONS

Chang, Min Kuan "Ultrawideband Systems: Fundamentals and Standardization, Lecture 9," URL:http://uwb.ee.nchu.edu.tw/Lectures/UWB_Lecture09_v4.pdf>, 1-74 (2008).

Suwansantisuk, Watcharapan and Win, Moe Z "Optimal Search Strategies for Ultrawide Bandwidth Signal Acquisition," *IEEE*: 349-354 (2005).

Suwansantisuk, Watcharapan "Multipath Aided Rapid Acquisition," URL:http://dspace.mit.edu/bitstream/1721.1/16697/1/57396373.pdf (2008).

International Preliminary Report on Patentability and Written Opinion of the International Searching Authority, for PCT US2007/023703, mailed on May 22, 2009.

* cited by examiner

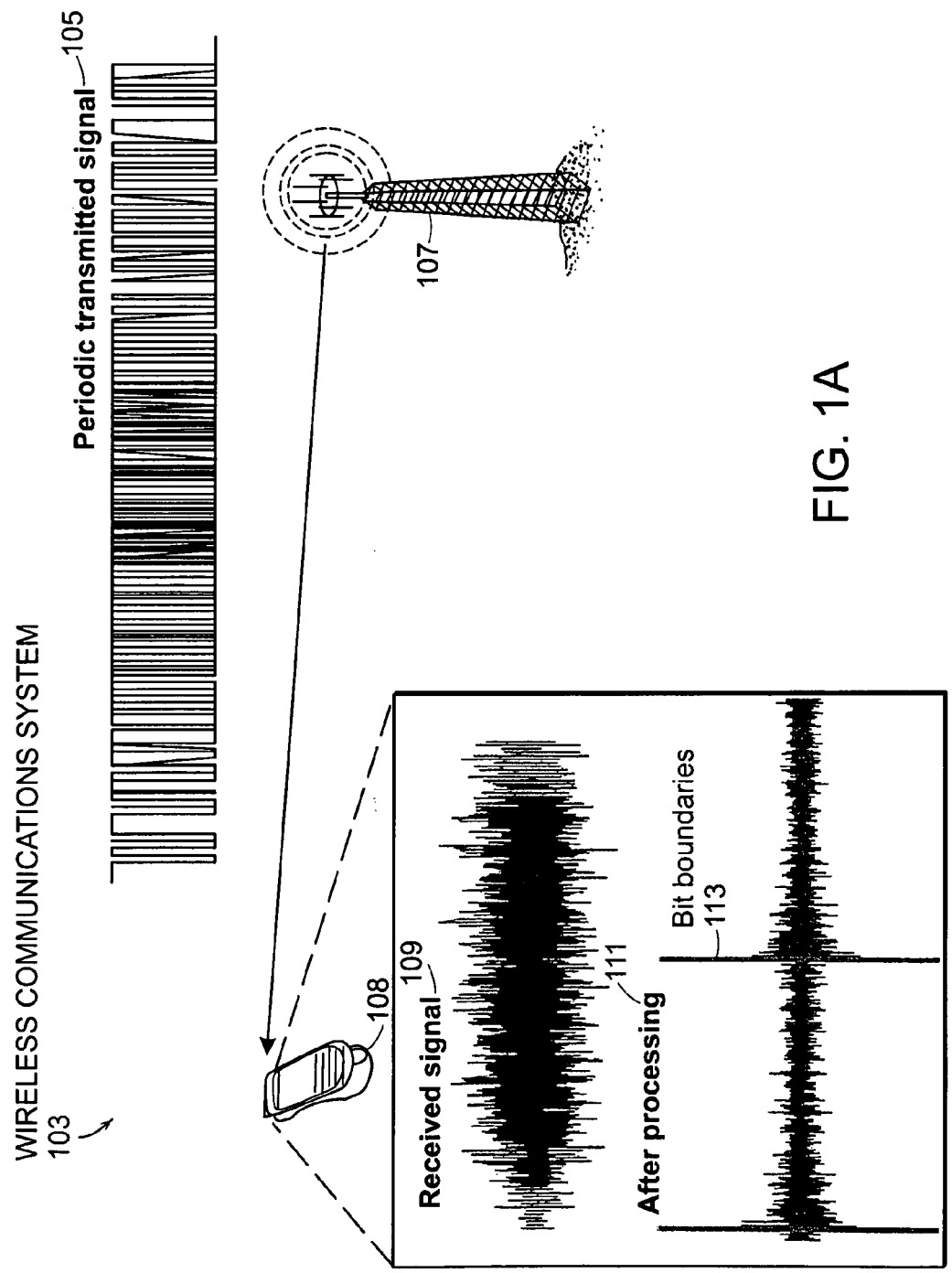

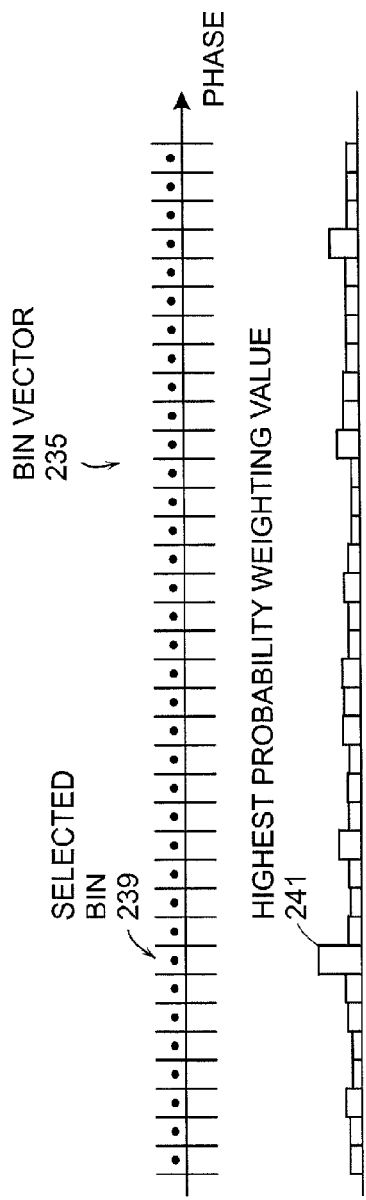
FIG. 2C (PROBABILITY/WEIGHTING & RATED BIN SELECTION)
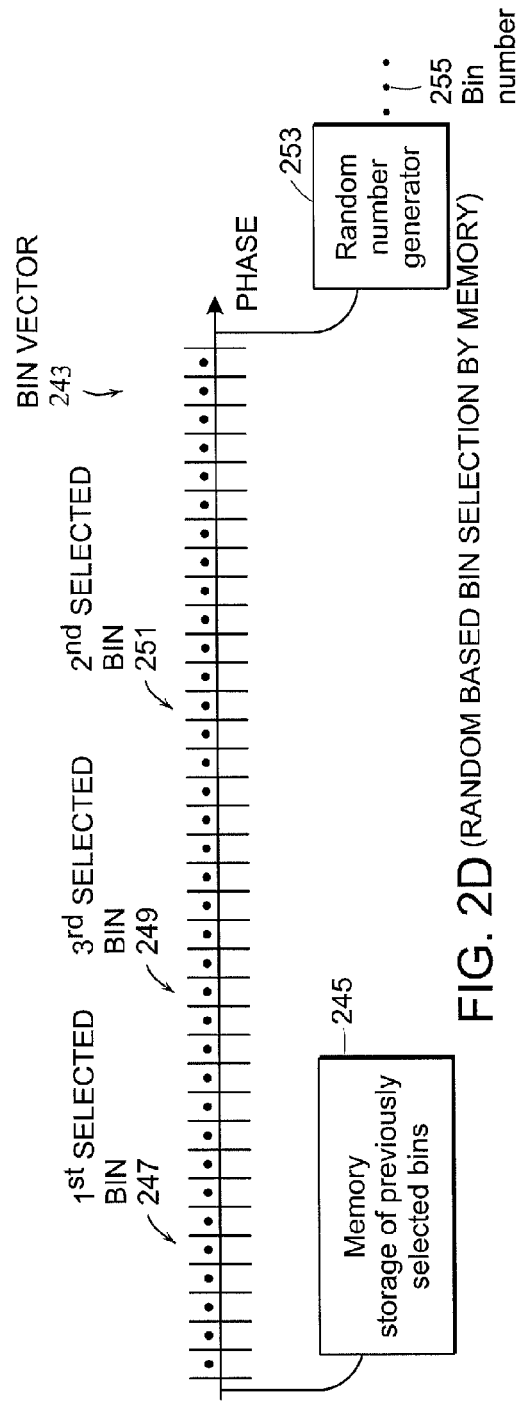
FIG. 2D (RANDOM BASED BIN SELECTION BY MEMORY)

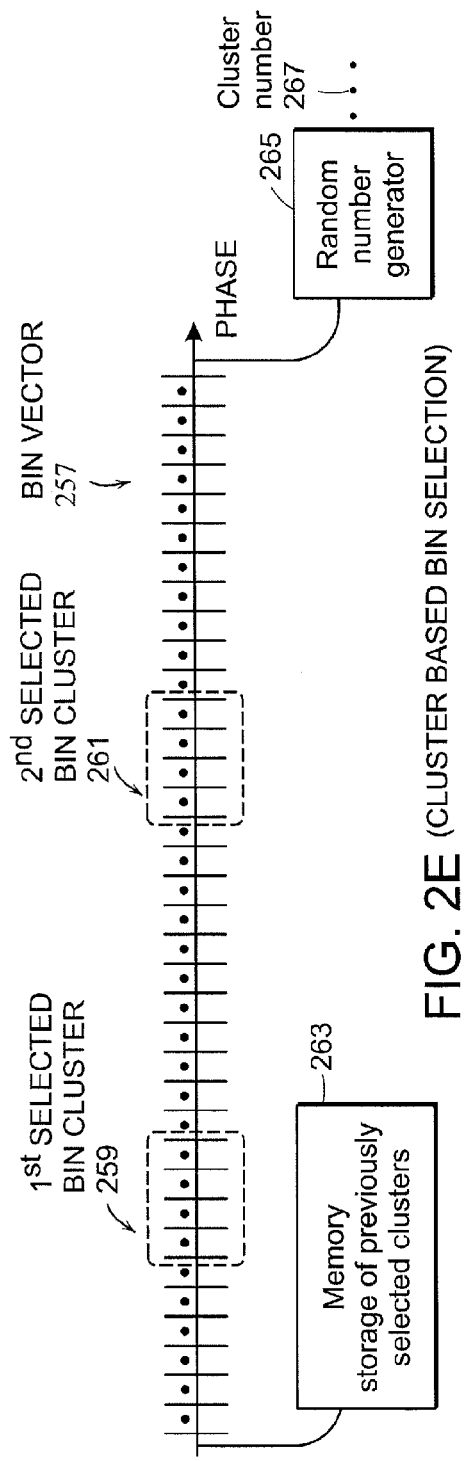
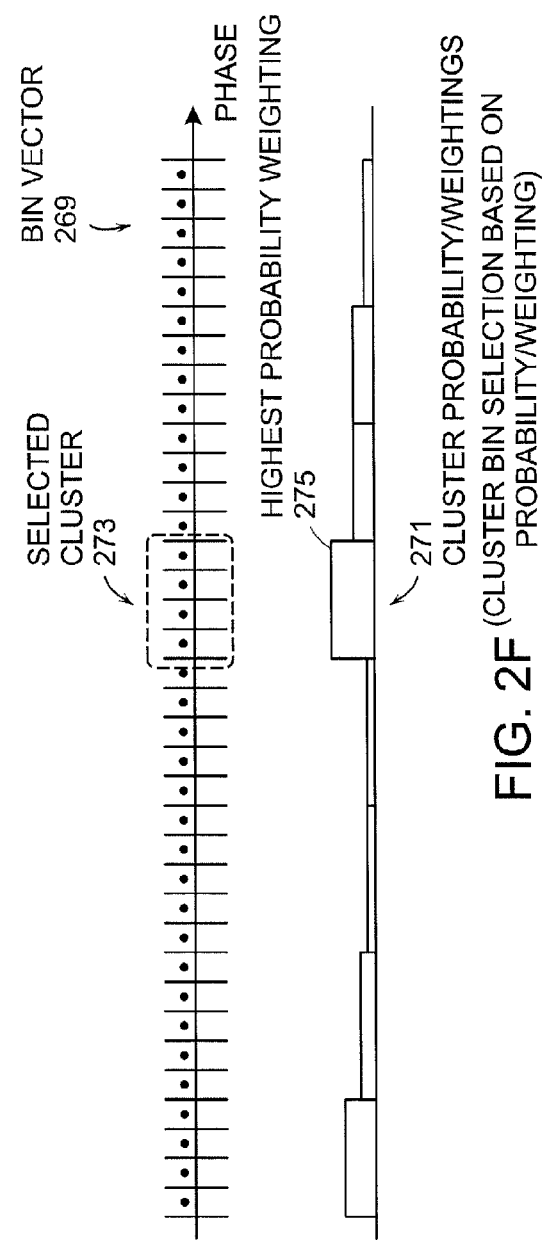
FIG. 2E (CLUSTER BASED BIN SELECTION)
FIG. 2F (CLUSTER BIN SELECTION BASED ON PROBABILITY/WEIGHTING)

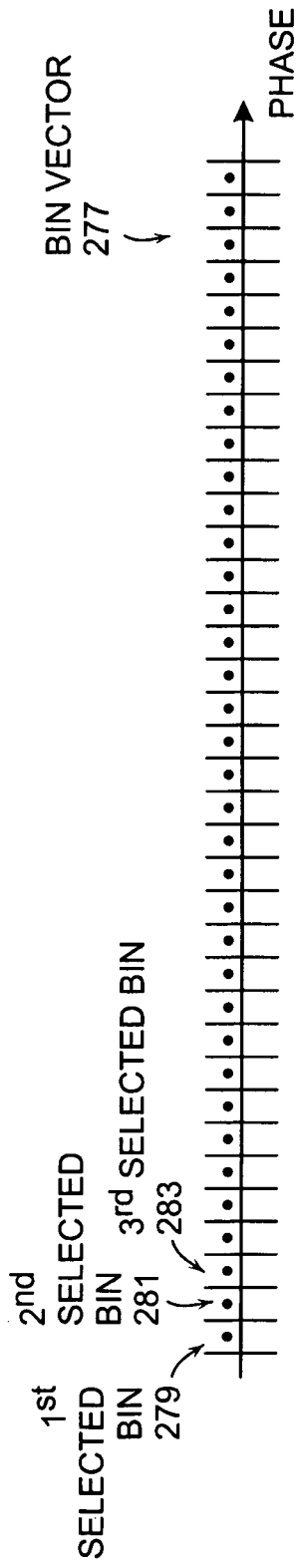
FIG. 2G (BIN SELECTION BASED ON FIXED SERIAL SEARCHES)

PSEUDO CODE FOR ASSIGNING OR UPDATE THE
PROBABILITY/WEIGHTING OF BINS

[line 1] IF (Previous Probability (S) <1 or DCx <1) THEN
  [line 2] Pnew (S) = Previous Probability (S)*(1-DCx)/(1-Previous probability (S) * DCx), for phase S; and
  [line 3] Pnew (S) = Previous Probability (s)/(1-Previous probability (S) * DCx), for all other phases s not equal to S

[line 5] IF (Previous Probability (S) =1 and DCx =1) THEN
  [line 6] Pnew (S) = 0 for phases S; and
  [line 7] Pnew (S) = 1/(number of phases -1), for all other phases not equal to S

FIG. 4C

METHOD AND APPARATUS FOR SIGNAL SEARCHING

RELATED APPLICATIONS

This application claims the benefit of U.S. Provisional Application No. 60/857,810, filed on Nov. 8, 2006. The entire teachings of the above applications are incorporated herein by reference.

GOVERNMENT SUPPORT

The invention was supported, in whole or in part, by a grant N00014-03-1-0489 from the Office Of Naval Research. The Government has certain rights in the invention.

BACKGROUND OF THE INVENTION

There has been considerable interest in the use of ultrawide bandwidth (UWB) systems for both commercial and military applications. UWB may be used to refer to any radio technology having bandwidth exceeding the lesser of 500 MHz or 20% of the arithmetic center frequency, according to Federal Communications Commission (FCC). The use of large transmission bandwidth translates to many advantages over the conventional narrowband systems. To realize these advantages, however, the receiver may need to perform signal acquisition.

Signal acquisition may involve detecting timing delay. To perform signal acquisition, the receiver quantizes signal as a function of uncertainty range into several small ranges, referred to as bins or cells. Signal acquisition is completed when a receiver detects an in-phase bin, which is defined as a bin that corresponds to a timing delay or phase of a propagation path. In general, the receiver performs best if it completes the signal acquisition as fast as possible. A few prior art methods of signal acquisition employ accelerators, whose cost of processing is proportional to time used to test a particular bin or location.

SUMMARY OF THE INVENTION

Acquisition of wide or ultra bandwidth signals is a challenging task. The use of a wide transmission bandwidth typically translates into a large mean acquisition time (MAT). A large MAT may increase design and processing costs associated with the acquisition. There are two major approaches to improve the MAT. The first approach improves the MAT at a detection layer. For example, a receiver may dedicate more resources, such as correlators, to form a decision variable. The second approach is to improve the MAT at a search layer. For example, a receiver may use a search pattern, such as an expanding zigzag window, a non-consecutive or consecutive serial search (CSS), a fixed-step serial search (FSS), or a bit-reversal search. However, these searching methods still yield high design and processing costs.

In an example embodiment of the present invention, a searching apparatus and corresponding method for use that may reduce the MAT, and, therefore, reduce design and processing costs, is presented. The apparatus may include a selecting unit configured to select a first bin within a range of bins characterizing an uncertainty region, each bin corresponding to a phase of a transmitted signal, and a comparing unit configured to compare a local signal, which may have a phase corresponding to the first bin, with a received signal, that may be received via a transmission medium. The searching apparatus may also include a reporting unit that may be configured to report whether the local signal matches the received signal and an assigning unit that may be configured to assign weightings to the bins if the local signal and the received signal do not match. The selecting unit may further be configured to select a next bin according to the weightings, and the comparing unit may further be configured to compare subsequent bins at least until the local signal, having a phase corresponding to the next bin, matches the received signal.

The selection of the next bin may be based on the transmission medium. The selection of the next bin may be based on selecting randomly and uniformly from the range of bins while excluding the previously selected bin. The selection of the next bin may also be based on a posteriori probability. The posteriori probability of a random event or an uncertain proposition is the conditional probability that is assigned when the relevant evidence is taken into account. The selection of the next bin may be based on a serial search. The weightings may also be updated according to the posteriori probability. The weightings may be updated except when a previous bin is assigned a weighting of zero. At least one preliminary comparison between the local signal and the received signal may be performed.

BRIEF DESCRIPTION OF THE DRAWINGS

The foregoing will be apparent from the following more particular descriptions of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A is a diagram of an example of a wireless communications system employing phase/bin selection;

FIGS. 2C-2G are bin diagrams illustrating methods of bin selection according to example embodiments of the present invention;

FIG. 4C is pseudo code of software instructions for updating/assigning probability/weightings of bins according to example embodiments of the present invention.

DETAILED DESCRIPTION OF THE INVENTION

Figure 1B:
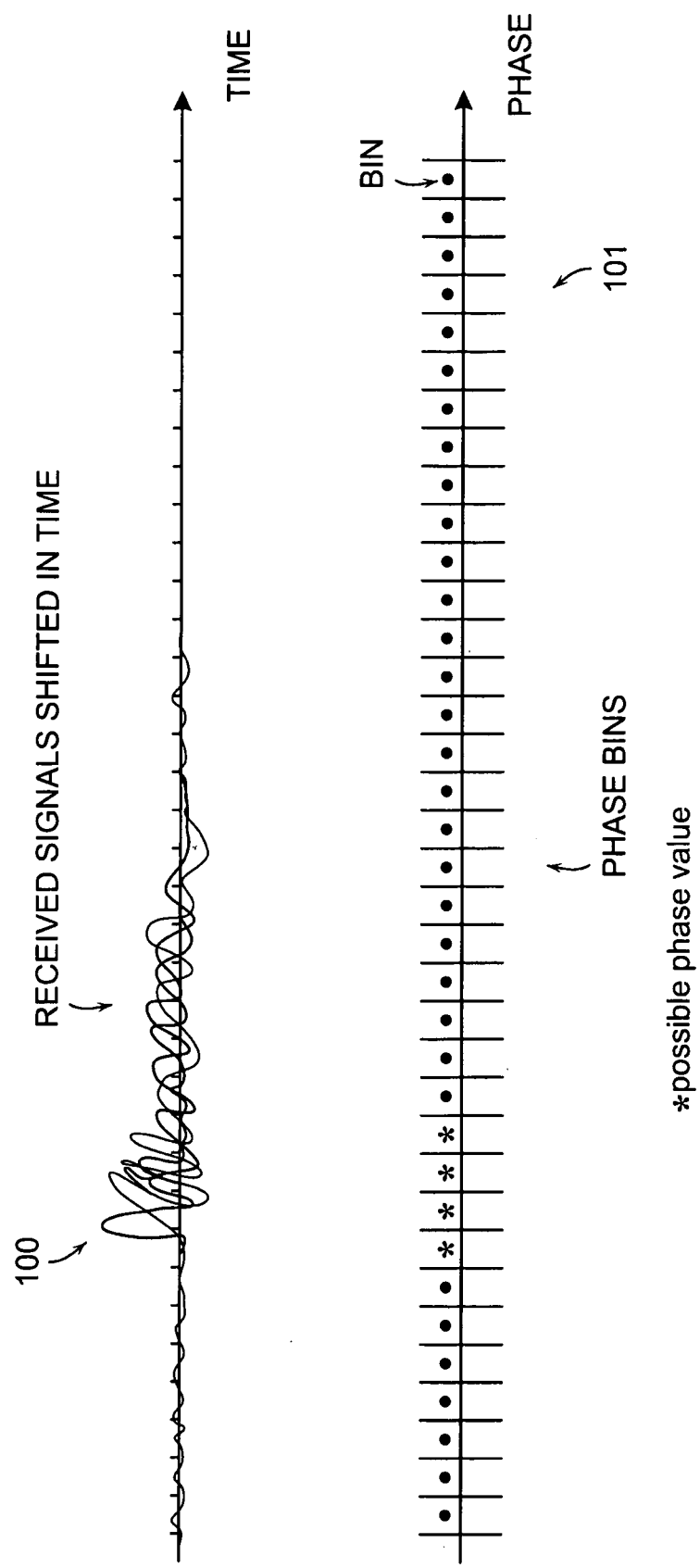
FIG. 1B is a graphical depiction of received signals and a depiction of a vector of phase bins.

A description of example embodiments of the invention follows.

In example embodiments of the present invention, techniques for searching for one or more targets are presented. In terms of wireless communications, the target may be a received signal, and the description below is presented in that example context. However, it should be understood that the example embodiments may be applied to technologies other than wireless communications.

FIG. 1A illustrates an example of a wireless communications system 103. A periodic signal 105 may be sent to a receiver with the use of a transmitter. In the present example, the receiver is a cell phone 108, and the transmitter is a base station 107. Due to noise, dispersion, and/or interference, for example, the receiver 108 may receive multiple reflected copies of the transmitted signal 109 due to multi-path, for example, with each copy being an attenuated version of the original transmitted signal shifted in time or phase. Therefore, the receiver may perform operations, such as frame synchronization and decoding of a received message, after signal acquisition. Upon initial processing, the processed signal 111 may be used by the receiver for the evaluation of the received bits of data. Signal acquisition may be used to determine the bit boundaries of the processed signal. Since the receiver may have received an attenuated version of the transmitted signal, it is useful to determine the bit boundaries so that each bit may be read at its starting point. Without determining bit boundaries, a bit may be read, for example, at its mid-point, resulting in a loss of information.

FIG. 1B provides another illustrative example of signals that may be received by a receiver 100. As shown, the receiver may receive multiple attenuated versions of the transmitted signal. During the signal acquisition stage, a search may be performed to identify the phase of the received signal in relation to the transmitted signal. In processing the received signals for the purpose of signal acquisition, each received signal may be evaluated against a series of bins in a vector of bins 101. Each bin may correspond to an individual phase included in the observation under evaluation. As an initial search, the receiver may choose the bins denoted with an '*' symbol, which may represent an estimation of the correct phase. For example, if a known pattern or signal includes seven bits of '1010110,' the received signal may be the string '10110 . . . 1010110.' Therefore, the received signal has a phase of two with respect to the known pattern or transmitted signal (i.e., the received signal begins with the second bit in the known pattern). In this example, a phase of zero refers to the original pattern or transmitted signal with zero phase offset.

Figure 2A:
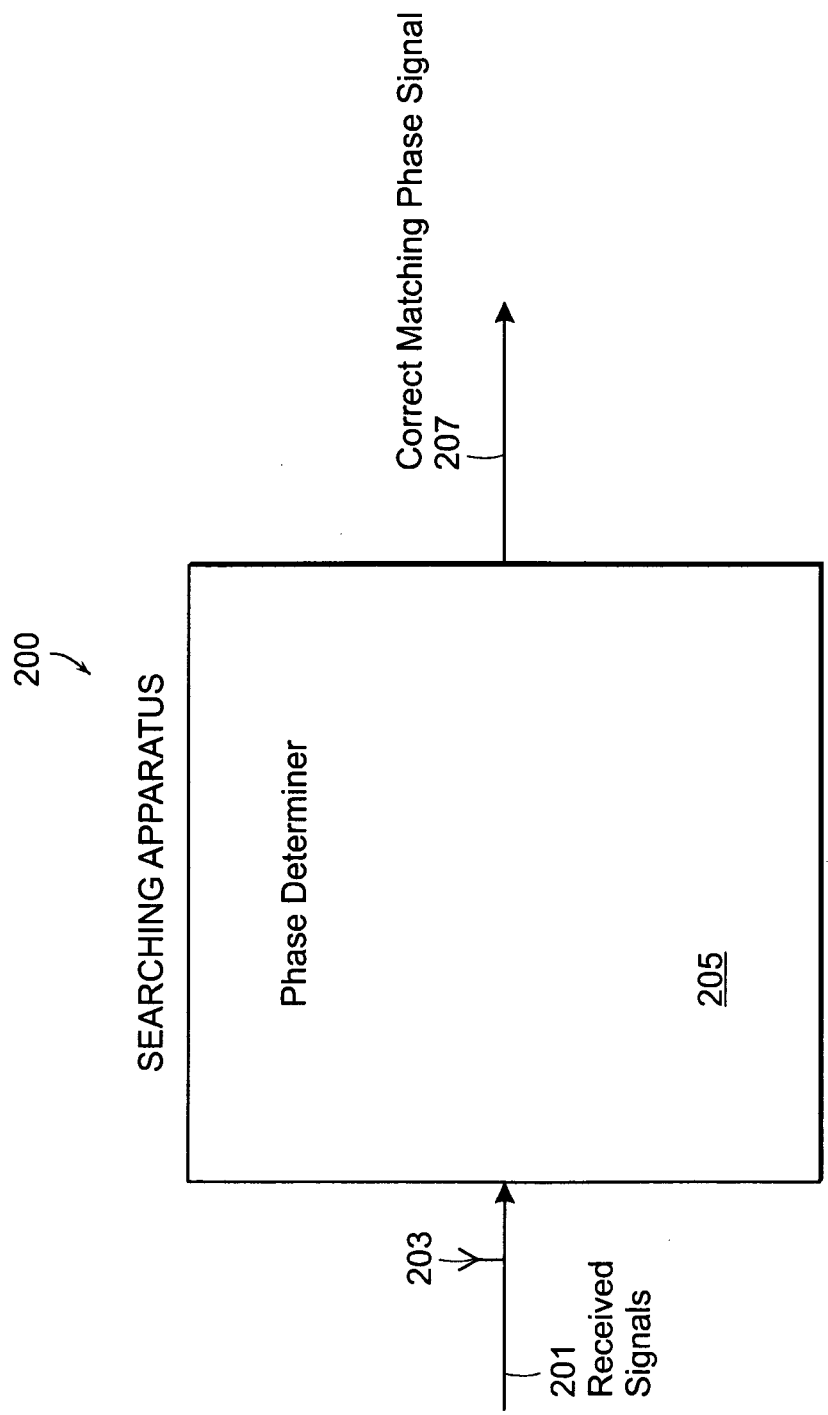
FIGS. 2A and 2B are block diagrams of a searching apparatus according to example embodiments of the present invention.

FIG. 2A illustrates a searching apparatus 200 that may be employed in the signal acquisition stage, according to example embodiments of the present invention. The searching apparatus 200 may be configured to receive any number of transmitted signals 201 with the use of one or more antenna(s) 203. The searching apparatus 200 may include a phase determiner 205 that may be configured to identify the received signal having a phase equal to the phase of the original transmitted signal. The phase determiner may thereafter report the signal with the correct matching phase 207, or report the matching phase for use by another system, such as feedback to the transmitter or offset by another receiver (not shown) receiving the same signal, possibly at the same phase or known phase offset from the phase received by the phase determiner 205.

Figure 2B:
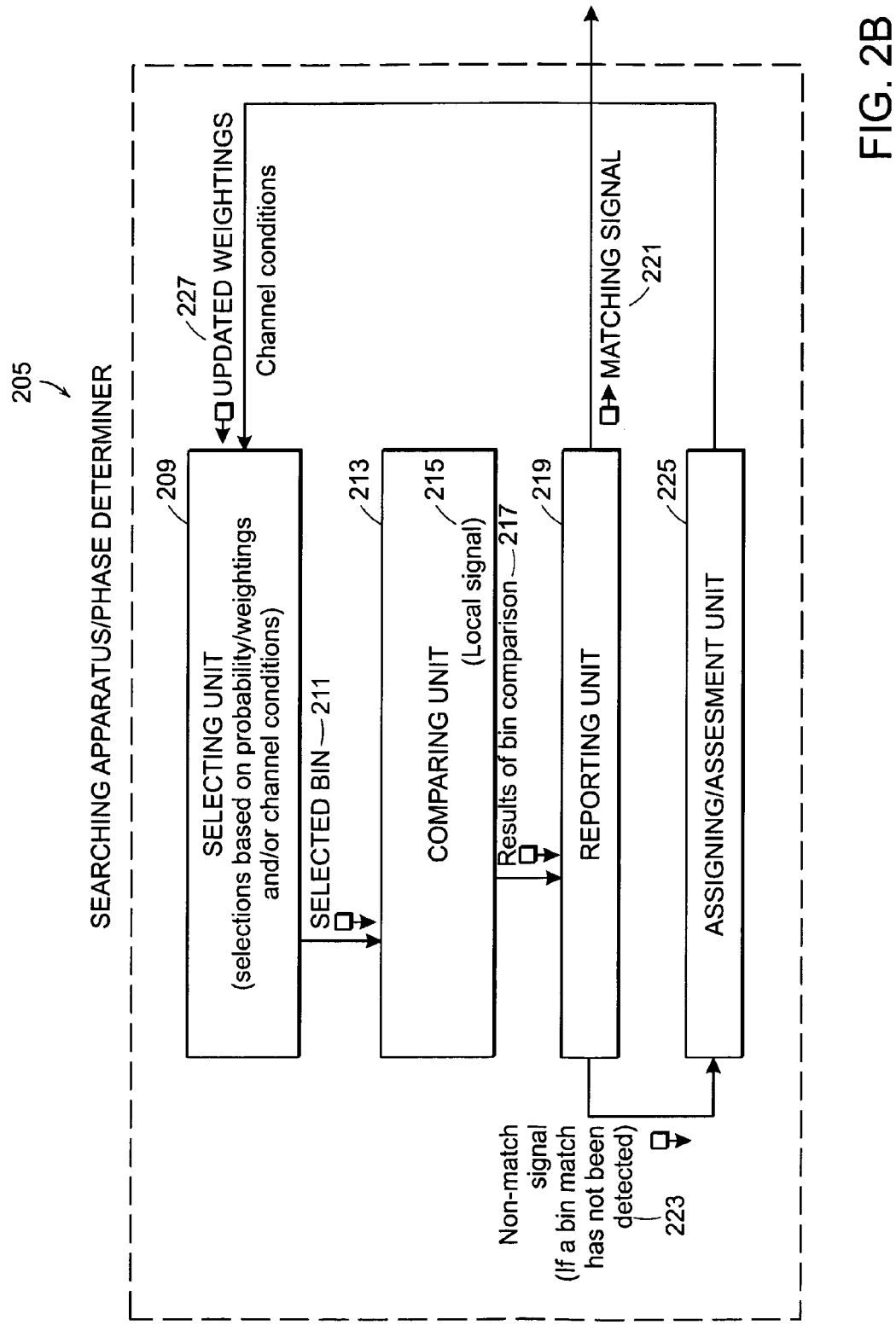
Figure 3:
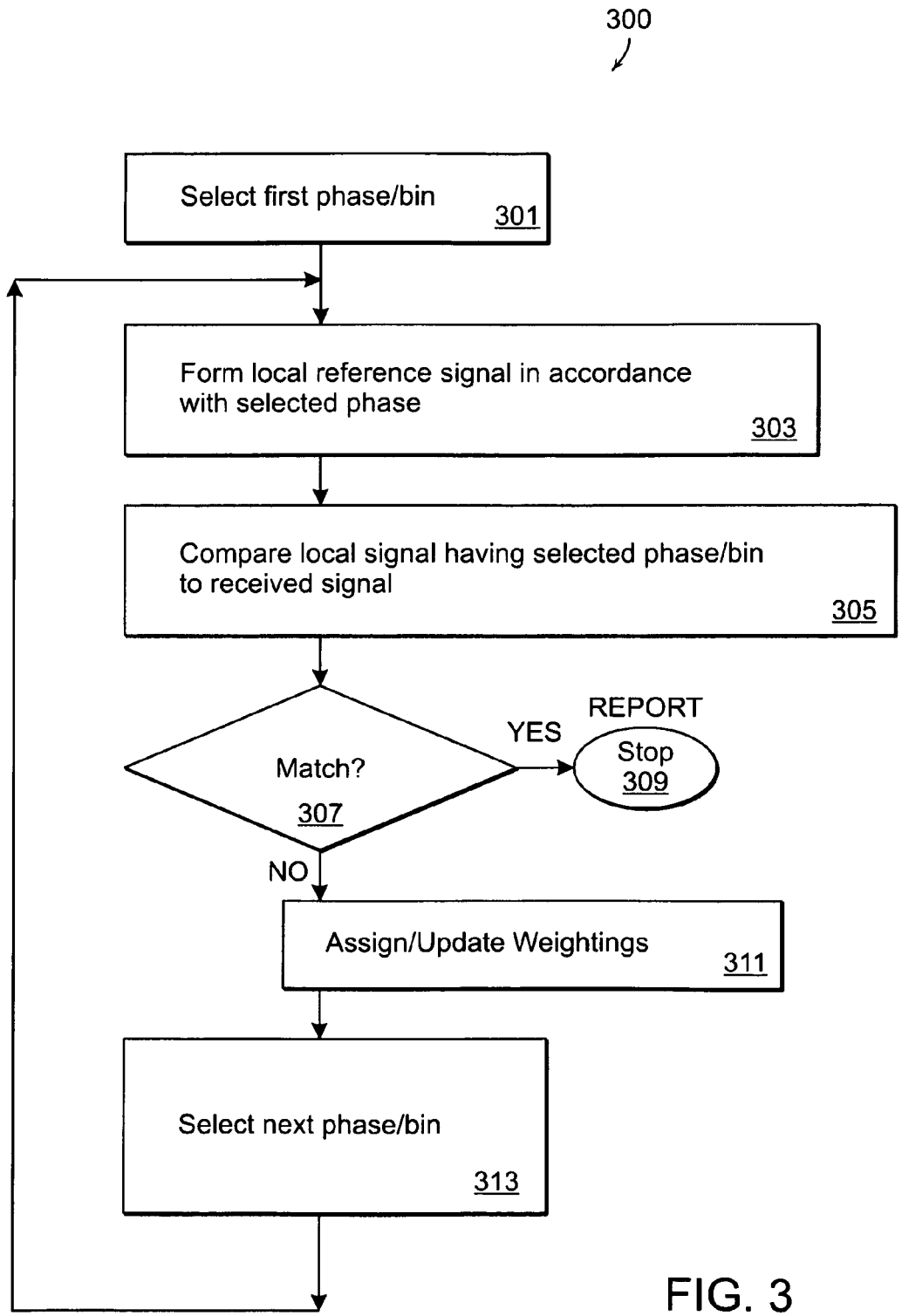
FIG. 3 is a flow diagram of operations performed by the searching apparatus of FIGS. 2A and 2B according to example embodiments of the present invention.

FIG. 2B illustrates the various components that may be included in a phase determiner 205, and FIG. 3 illustrates example operations of the phase determiner of FIG. 2B, according to example embodiments of the present invention. During an initial pass, the searching apparatus/phase determiner 205 may include a selecting unit 209 that may be configured to select a phase/bin 211, from a vector of bins associated with a received signal, of a corresponding phase value (301). The selected phase/bin 211 may be sent to a comparing unit 213 that may be configured to generate a local reference signal having the same phase as the phase associated with the selected bin (303). The comparing unit 213 may also compare the generated local signal to the measured received signal (305) in order to determine if a match exists (307). The comparing unit 213 may send the results of the comparison 217 to a reporting unit 219. If a positive match is detected, the reporting unit 219 may send a positive match signal 221, to the receiver instructing the searching apparatus to end the signal acquisition stage (309). If a negative match is detected, the reporting unit 219 may send a negative match signal 223 to an assigning unit 225. The assigning unit 225 may assign a weight, or update a current weight 227, to all, or a subset of, the bins of the vector (311). Upon assigning or updating the weights of the bins, the assigning unit 225 may send the updated weightings 227 to the selecting unit 209. It should be appreciated that in place of, or in addition to, the assigning unit, an assessment unit may be used. The assessment unit may determine environment of channel conditions, which may be sent to the selecting unit. The selecting unit 209 may then select a new bin for comparison based on the updated weightings or channel conditions (313). It should be appreciated that the assigning unit 225 may also update or assign probability values to the bins if a negative match is reported by the reporting unit 219. The assessment unit may be configured to continuously, or continually, monitor the channel conditions during each selecting cycle or during a pre-determined time period.

A number of methods may be employed in selecting, by the selecting unit 209, the next phase/bin for comparison, according to example embodiments of the present invention. One such method may include bin selection based on probabilities. Initially, the vector of bins may have a uniform probability distribution, indicating that each bin in the vector of bins is equally likely to have a phase that is correctly matched to the phase of the receiving signal. Thus, each bin in the vector may have an equal weighting. The assigning unit 225 may continuously, or continually, update a probability distribution of the vector of bins, based on a posteriori probability. Updating the probability distribution may be done by assigning the bins updated weightings or probabilities. In subsequent comparisons, the selecting unit 209 may select the phase/bin that has the highest weighting or the phase/bin associated with the highest posteriori probability value.

FIG. 2C provides an illustrative example of a selection for a subsequent comparison. Each bin in the bin vector 235 may be evaluated with regard to its corresponding probability/weightings 237. A bin 239 corresponding to the highest probability/weighting 241 may thereafter be selected.

FIG. 2D illustrates a second method of selection, according to an embodiment of the present invention, may include a random selection of a next phase/bin with memory. As shown in FIG. 2D, in a bin vector 243, a first bin 247 may be selected randomly. Subsequently a second and third bin 251 and 249, respectively, may be chosen. A memory unit 245 may be used to record the bins that have been selected. Thus, after it has been determined that a specific bin does not provide a matching local reference signal, that bin may be excluded from subsequent bin selections. Therefore, a phase/bin may be randomly selected, but once a phase/bin has been selected and tested, the searching apparatus may take note that the phase/bin has been selected and therefore not select the same phase/bin twice in subsequent comparisons.

It should also be appreciated that the selecting unit 209 may include a random number generator 253 that may be configured to select a bin number 255 randomly. The selected number may be mapped to the number of possible phase selections. For example, if a random number generator, implemented, for example, using software, generates a random number in the number range 1 . . . M, inclusively, and there are 'n' phases, each of the 'n' phases may be associated with a portion of the M numbers. Assuming M is equally divisible by 'n' in this example, the portion associated with each of the 'n' phases may include a contiguous range of 'M/n' numbers so that the first phase may be selected if the random number is in the range 1 . . . M/n, the second phase may be selected if the random number is in the range M/n+1 . . . 2*M/n, and so on.

FIG. 2E illustrates another method for searching, according to an embodiment of the present invention, which may include cluster searching. As shown in FIG. 2E, in cluster searching a group of adjacent phases/bins 259, included in the bin vector 257, may be selected by the selecting unit 209 at the same time. The comparison unit 213 may be configured to process or compare the received measured signal to each of the cluster bins in a parallel fashion. It should be appreciated that each phase/bin in the selected cluster may also be compared in a serially or random fashion. Subsequent clusters, such as cluster 261, may be selected with or without memory of previously selected clusters. In example embodiments, the memory aided selection may be performed with a memory unit 263. A random number generator 265 may also be employed to provide a cluster number 267 in the random selection of subsequent clusters.

FIG. 2F illustrates that the clusters may also be chosen based on a probability or weighting. As shown in FIG. 2F, each cluster in the bin vector 269 may be evaluated with regards to its corresponding probability/weightings 271. A cluster 273 corresponding to the highest probability/weighting 275 may thereafter be selected. It should also be appreciated that the size of the cluster may be dynamic and may depend on environment and/or channel conditions. It should also be appreciated that not all the clusters included in the bin vector need be the same size.

FIG. 2G illustrates yet another method of selecting a next phase/bin which may include fixed serial searching (FSS). In fixed serial search, the phases/bins may generally be selected in order. As shown in FIG. 2G, a first bin 279 included in bin vector 277 may be chosen. The subsequent bin chosen 281 may be the immediately next bin, in terms of phase. Following the same logic, a third bin 283 and so on may be chosen until a match is obtained. It should be appreciated that in example embodiments, portions of the vector may employ a FSS method of selection based on environment or channel conditions.

It should be appreciated that in an embodiment of the present invention, any of the above mentioned searching methods may be used in combination. For example, the cluster searching method may be performed randomly with or without memory. The cluster searching method may also be performed in conjunction with the probability method, where a probability distribution, or weighting, of each cluster may be updated as a function of previously compared clusters.

It should also be appreciated that any method of phase/bin selection may be chosen based on characteristics of the transmission medium or channel condition. In the example of wireless communications, the transmission medium may be air. The channel condition may be determined by analyzing the received measured signal for characteristics, such as, but not limited to, signal strength and signal-to-noise ratio (SNR). Characteristics of the transmission medium may be determined by analyzing the environment of the transmission medium. The method of selecting a next bin may also change during the signal acquisition stage. For example, if the measured signal is characterized as having a low SNR, a method of random bin selection with memory may be employed. If during the signal acquisition stage the measured signals are characterized as having a high or medium SNR, a method of cluster without memory or with memory may be employed.

The methods of bin selection discussed above may reduce the mean acquisition time (MAT). In an embodiment of the present invention, employing a quick test on the selected bin may also aid in the reduction of the MAT.

Figure 4A:
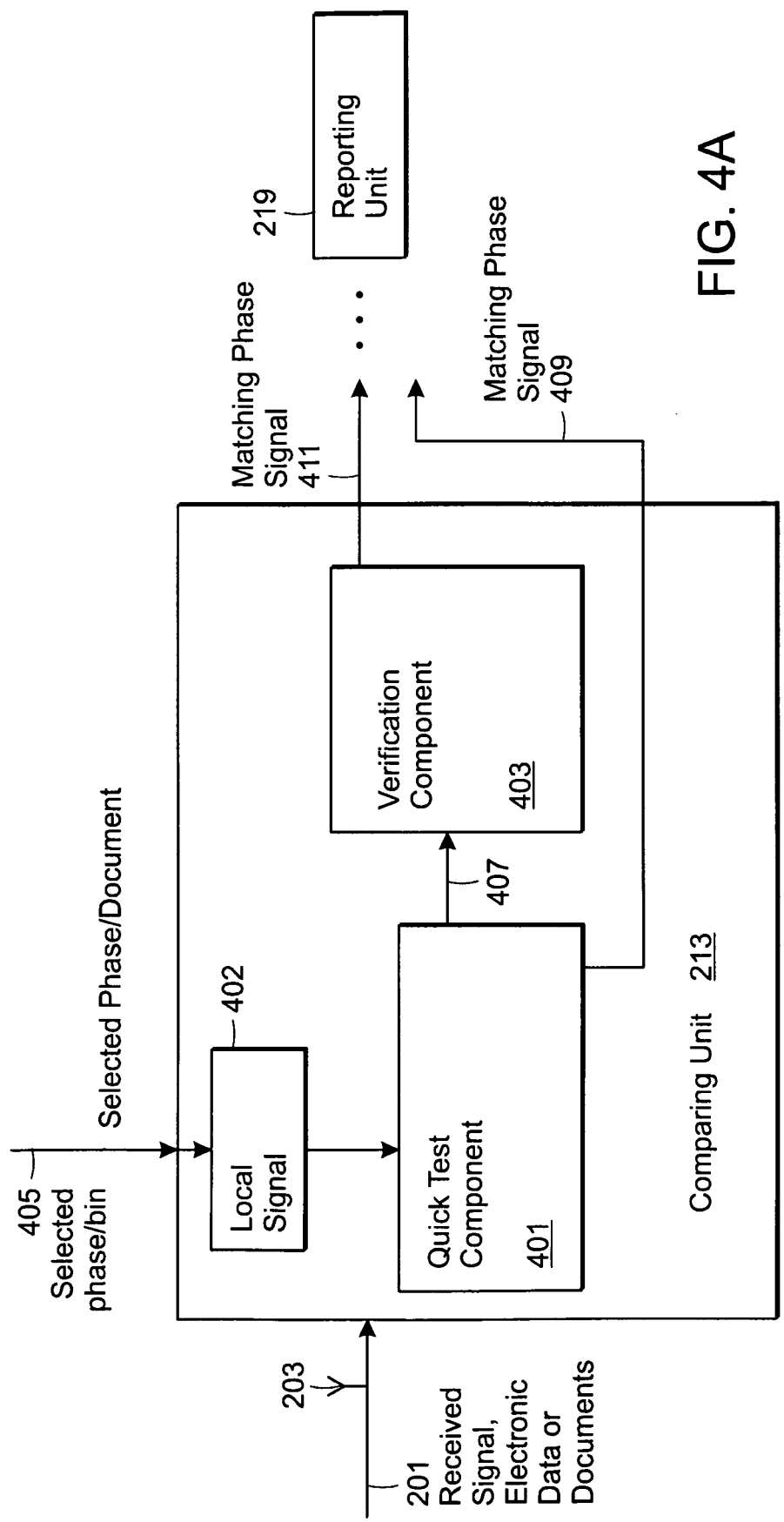
FIG. 4A is a block diagram of a comparing unit according to example embodiments of the present invention.

FIG. 4A illustrates a comparing unit 213 featuring a quick test component 401 and a verification component 403. In operation, according to example embodiments, a signal 201 received via an antenna 203 may be directed to the comparing unit 213. The selected phase/bin 405 may be used to generate a local reference signal 402 having a phase corresponding the to the selected phase/bin. The quick test component 401 may perform an initial determination or test as to whether the received signal 201 matches the local reference signal 402 having a phase corresponding to the selected phase/bin 405. The quick test 401 may act as a preliminary comparison, where only a portion of the received signal 201 and local reference signal 402 are compared.

Upon performing the preliminary comparison, the quick test component 401 may send a signal 409 to the reporting unit 219 if a negative match is determined to exist between the received signal 201 and the local reference signal 402. Thereafter, the selecting unit 209 may proceed with selecting a new phase/bin.

The quick test component 401 may also send a signal 407 to the verification component 403 indicating that a positive match between the received signal 201 and the local reference signal 402 has been obtained. Thereafter, the verification component 403 may perform verification processing on the received signal 210 and the local reference signal 402 in order to verify that the two signals do indeed match. Thus, the verification component 403 may perform a more in-depth comparison (e.g., a comparison involving a slower integration) than the preliminary comparison performed by the quick test component 401 (e.g., a comparison involving a faster integration). Upon the comparison, the verification component 403 may send a signal 411 to the reporting unit 219 indicating whether or not a match between the received signal 201 and the local reference signal 402 has been found.

It should also be appreciated that the comparing unit 213 may also be employed in document searches, where the received signal may be electronic data (e.g., a webpage or text document) or a document included, for example, in a database. Therefore, the quick test component 401 may be configured to evaluate only a portion of the electronic data or document in order to determine if the received electronic data or document matches a selected phrase or document 405 for which a user or system intends to search. Similar to the example using received wireless signals, if the quick test component 401 detects a positive match, the verification component may be employed to compare the received electronic data 201 with the selected phrase or document 405.

Figure 4B:
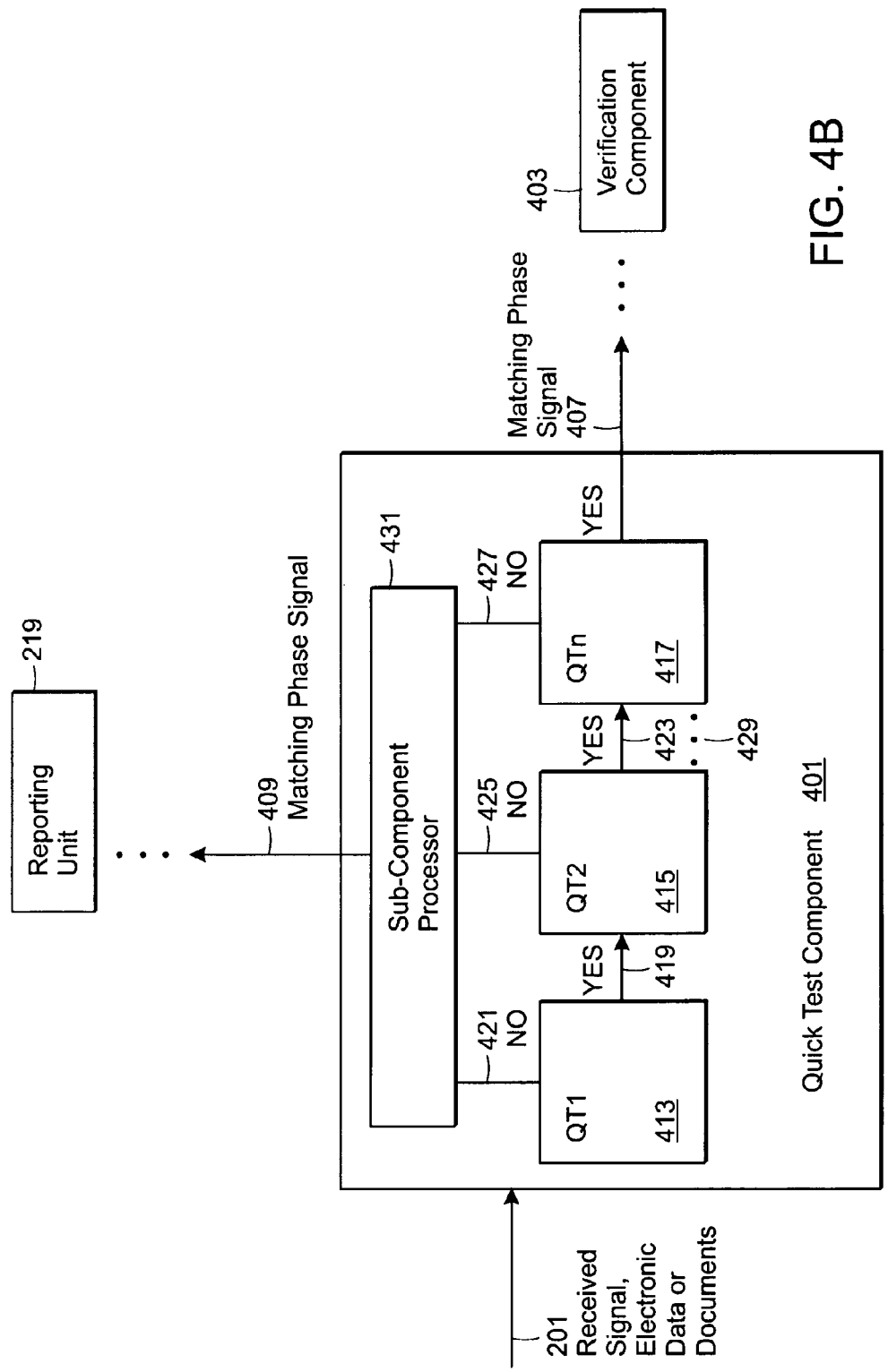
FIG. 4B is a block diagram of a quick test component according to example embodiments of the present invention.

FIG. 4B shows a schematic of elements that may be included in a quick test component 401, according to example embodiments of the present invention. The quick test component 401 may include a number of quick test sub-components, for example, sub-components $Q_{T1}$, $Q_{T2}$, . . . and $Q_{TN}$, 413, 415, and 417, respectively. It should be appreciated that although FIG. 4B only illustrates three quick test sub-components, any number of sub-components may be employed 429. Each of the quick test sub-components may perform a different quick test. For example, each quick test sub-component may compare different portions of the received signal 201 and the local reference signal 402. Each quick test sub-component may also employ a different method of comparing the measured signal 201 and the local reference signal 402. In addition, the quick test sub-component 413 may compare the received signal 201 and the local reference signal 402 over a small portion, while subsequent quick test sub-components 415 . . . 417 may compare the received signal 201 and the local reference signal 402 over larger portions. Furthermore, quick test sub-component 413 may make the decision based on a single comparison of the received signal 201 and the local reference signal 402 over the fixed portion, while subsequent quick test sub-components 415 . . . 417 may make the decision based on several comparisons of the received signal 201 and the local reference signal 402 over the disjoint portions.

If any of the three quick test sub-components 413, 415, or 417 detect that a match does not exist between the measured signal 201 and the local reference signal 402, signals 421, 425, and 427, respectively, may be sent to a sub-component processor 427. In example embodiments of the present invention, the sub-component processor may include an OR gate, where if a signal from any of the sub-components 413, 415, or 417 indicates a negative match, the sub-component processor may be configured to send a matching phase signal 409 indicating the negative match result to the reporting unit 219.

In the case that any of the quick test sub-components 413, 415, or 417 detect a positive match between the measured signal 201 and the local reference signal 402, the sub-components may send signals 419, 423, and 407, respectively, indicating a positive match has been detected. In example embodiments, the sub-components 413, 415, or 417 may compare the measured signal 201 and the local reference signal 402 sequentially or in parallel. Once the sub-component processor 431 has determined that all the quick test sub-components have registered a positive match, the quick test component 401 may be configured to send a matching phase signal 407 indicting the positive match to the verification component 403.

In example embodiments of the present invention, the various quick test sub-components may be ordered from least to most costly, determined in accordance with one or more criteria for the particular application. The quick test sub-components may also be utilized in order from least to most expensive (e.g., in terms of processing costs) so that the most expensive or costly quick test sub-component is utilized only after one or more lesser costly sub-components have determined the selected phase/bin provides a generated local reference signal 402 matching the received signal 201. It should be appreciated that any other ordering of sub-components may be employed.

It should also be appreciated that the quick test component 401 may also be employed in document searches, where the received signal may be electronic data (e.g., a webpage or text document) or a document included, for example, in a database. Therefore, the various quick test sub-components 413, 415, 417, and 429 may be configured to evaluate portions of the electronic data or document in order to determine if the received electronic data or document matches a selected phrase or document 405 for which a user or system intends to search. Similarly to the example using received wireless signals, if all of the sub-components detect a positive match, the verification component may be employed to compare the received electronic data 201 with the selected phrase or document 405.

It should further be appreciated that each quick test sub-component may have an associated degree of certainty. The more costly the quick test evaluation (e.g., the more number of quick test sub-components included in the searching apparatus), the higher the degree of certainty that may be associated with a negative match decision. In other words, there may be a higher confidence that the resulting match decision or determination has made by the particular quick test sub-component is correct as the design cost of the searching apparatus increases.

As such, the probability of a selected phase (S) which has just caused a quick test sub-component ($Q_{Tx}$) to yield a negative match result may have its associated probability adjusted in accordance with a degree of certainty (DC) associated with the quick test sub-component $Q_{Tx}$. The DC for each $Q_{Tx}$ may describe a degree of confidence or reliability of the test, and may also be manually or otherwise assigned or may be empirically determined based on the knowledge of the designer. Other example embodiments may initially select DCs using other manual and/or automated techniques.

In example embodiments of the present invention, at initialization, all phases/bins may have an equal probability of being the correct phase/bin. On subsequent iterations selecting a phase/bin, a selected phase S determined not to be a match by a $Q_{Tx}$ component having an associated degree of certainty $DC_x$ may cause an adjustment of the probability associated with the selected phase/bin $S_x$, and an adjustment of probability associated with each other phase/bin in the vector 's,' where 's' does not equal 'S.'

FIG. 4C is a listing of example pseudo code of software instructions for the probability/weighting assigning/updating process for the above mentioned example when a previously selected phase/bin has been determined to not be equivalent to the phase associated with the received signal. Pnew(S) may be defined as the new probability of the selected phase S after adjustment, and Pnew(s) may be defined as the new probability of each remaining phase s, other than the selected phase S. The DC value may be a real numbered value in the range of 0 . . . 1, inclusively, with a higher DC value representing a greater degree of certainty. In [line 1] of the code, the value of the probability of a previously selected phase S and associated $DC_x$ is evaluated. If the evaluated value $DC_x$ has a value less than one, the previous quick test may not be 100% reliable, therefore the probability of the previously selected phase is updated according to the equation described in [line 2] of the code. The probability of all the other phases/bins may be updated according to the equation described in [line 3] of the code.

In the case that the probability of the previously selected phase/bin S and the associated degree of certainty $DC_x$ both have a value of one, the previous quick test may be deemed as reliable, and therefore the probability associated with the previously selected phase/bin may be set to zero as described in [line 6] of the code. The probability of all the other phases/bins may be updated according to the equation described in [line 7]. It should be appreciated that the code of FIG. 4C is merely an example and that any other form of instructions may be employed.

Figure 5:
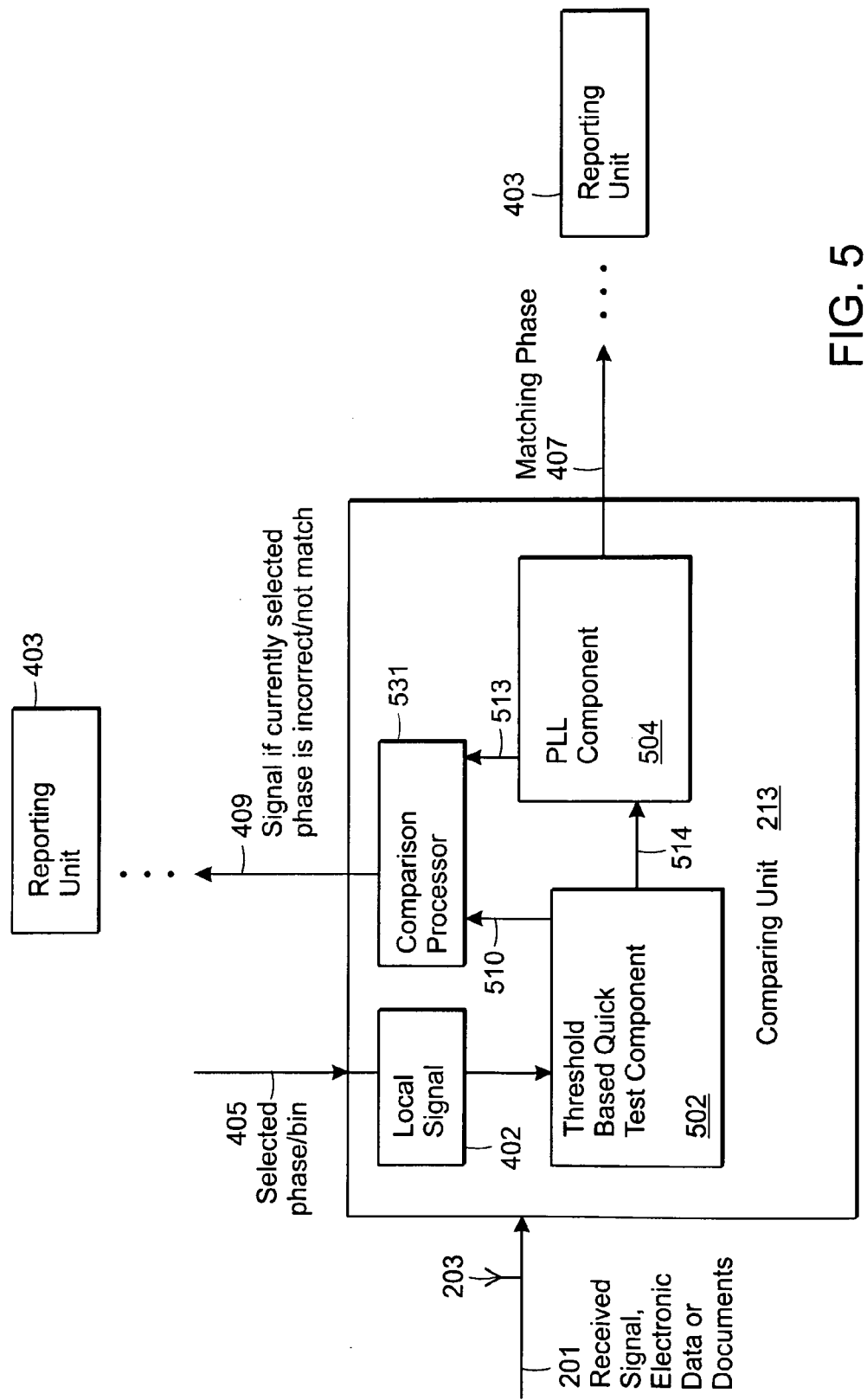
FIG. 5 is another block diagram of a comparing unit according to example embodiments of the present invention.

FIG. 5 illustrates another example configuration of the comparing unit 213 according to example embodiments of the present invention. In the comparing unit 213 of FIG. 5, a threshold-based quick test component 502 may be employed to perform a comparison of a portion of the received signal 201 with a portion of the local reference signal 402. In a threshold-based test, a portion of the received signal 201 and a portion of the local reference signal 402 may be correlated with one another. If the threshold-based quick test component 502 determines a match, the component may send a signal 514 to a phase locked loop (PLL) component 504 indicating a positive match has been found. The PLL component 504 may perform verification processing in order to examine the additional portions of the received signal 201.

In the case that the threshold-based quick test component 502 and/or the PLL component 504 detects a negative match between the received signal 201 and the local reference signal 402, the components may send signals 510 and 513, respectively, to a comparison processor 531. Similar, to the sub-component processor 431 of FIG. 4B, the comparison processor 531 may be configured to send a signal 409 to the reporting unit 403 indicating a negative match result has been obtained. In example embodiments of the present invention, the comparison processor 531 may include an OR gate configured to send the signal 409 indicating the negative match result if either one of the signals 510 or 513, from components 502 and 504, respectively, indicates a negative match. It should be appreciated that any form of quick test known in the art may be employed. For example, a bit-wise quick test may be employed with binary forms of the received signal 201 and the local reference signal 402 may be digitally compared.

It should also be appreciated that the comparing unit 213 of FIG. 5 may also be employed in document searches, where the received signal may be electronic data (e.g., a webpage or text document) or a document included, for example, in a database. Therefore, the threshold-based test component 502 may be configured to evaluate only a portion of the electronic data or document in order to determine if the received electronic data or document matches a selected phrase or document 405 for which a user or system intends to search. Similarly to the example using received wireless signals, if the threshold-based test component 502 detects a positive match, the PLL component may be employed to compare the received electronic data 201 with the selected phrase or document 405.

It should be appreciated that in example embodiments of the present invention, the comparison unit may employ $N_c$ correlators to combine signals and may have two modes of operation, search and verification. In the search mode, a portion of the received signal may be correlated with the local reference signal using a bank of correlators. In the verification mode, a number of independent tests, which may be similar to that of the search mode, may be performed.

It should be appreciated that the comparison units described above may also be configured to perform processing which may take into account the presence of transmission errors included in the received signal. For example, the received signal may have been affected by noise or attenuation, therefore, the received signal may include erroneous bit values. The comparison units may perform processing which allows or accepts some degree of noise or attention to be present in the received signal, and may therefore determine a match between the selected phase or bin of the received signal in the presence of errors.

It should also be appreciated that the above embodiments may also be employed in other search applications including, but not limited to, drilling for a desired element such as oil, database queries, and searching for objects, such as celestial stars, underwater artifacts, or persons in connection with a wreckage at sea. It should also be appreciated that the techniques presented may also be used in connection with a variety of different search spaces in which there may be one or more correct matches or targets. For example, in connection with the wireless communications example of signal acquisition, there may be a single correct or matching phase for additive white Gaussian noise channels, and multiple correct or matching phases/bins for multi-path channels.

In example embodiments where a selection of oil drilling locations may be made, there may be more than one matching target. Each potential candidate location may be associated with a 'phase' or possible selection number. One or more quick tests may be used, for example, which are based on soil samples, seismic analysis, profiles of the layers underlying the surface based on any one of a variety of different techniques described herein, and the like. Rather than use a PLL technique for verification processing, verification may be performed by actually drilling for oil. Such processing may take place after one or more quick tests have determined that the selected location has oil located therein.

In connection with astronomy, a search may be performed looking for a particular star or other element having specified properties. There may be one or more elements which match the specified properties. For example, when looking for a particular type of star. A panoramic view of the sky or portion thereof may be partitioned into grid sections, each grid being assigned a coordinate. Therefore, there may be more than one in a grid section of the sky. On the other hand, the search criteria may specify a particular element for which there can be only one possible match, such as a known named planet. In example embodiments involving astronomy, quick tests may be performed, for example, using a low resolution telescope to determine if there are existing conditions associated with any celestial bodies matching those of a particular type of star. If so, that particular grid section may then be examined with a high resolution telescope as part of verification processing.

Example embodiments may also be used in connection with rescue operations and retrieval of an object. For example, when searching for an object under water or survivors in a wreckage at sea, a portion of the body of water or other area defining the search region may be partitioned into grid sections. Each of the grid sections may correspond to phase/bin, where the goal is to find a grid section where the object or person is located. A first quick test may be, for example, executing a low resolution SONAR on the area. A second quick test may include deploying an underwater camera. The verification mode may include sending a diver to a particular area corresponding to a grid section.

In applications directed to database or archival inquiry, example embodiments of the present invention may be used to search for documents that satisfy some specified criteria. Examples of specified criteria may be, for example, documents including one or more words in a search query. The documents may be included in one or more data stores or the same or different types. In some data stores including the documents to be searched, there may be no indexing of words included in the documents, and all such documents in the data stores may be searched. In one example application, the embodiments of the present invention discussed herein may be used to locate the first one of more matches, for example to display a result such as in connection with an Internet search. Each file in the one or more data stores may correspond to a phase/bin. A first quick test may be to read a portion of a file and decide based on a heuristic method whether the document is likely to be a match. For example, a document that is determined to be related to a painting or art based on examination of the portion of the document may include the search term of an artist such as 'Van Gogh.' A second quick test may be to read a second portion of the file and make a determination in accordance with the heuristic method. Verification may be accomplished by reading the entire file and determining if there is a match to the search term included therein.

It should also be appreciated that the example embodiments of the present invention described herein may be used in connection with criteria that vary in accordance with knowledge of a target. In other words, the example embodiments may be configured for use in connection with a variety of applications and may not require a specified amount of knowledge about the target for use.

As will be appreciated by those skilled in the art, the components and units herein may be implemented in a variety of different ways using a variety of different hardware and/or software components or units. The components and units may be implemented using hardware and/or software.

Components and units implemented using software may be, for example, source code written in a programming language which may be processed by one or more subsequent software components or units to produce machine executable code for execution on a processor such as any computer system known in the art. If implemented in software, in operation, a general purpose or application specific processor loads and executes the software or a derivative thereof (e.g., machine code) in a manner well understood in the art. The software may be stored on any form of computer readable medium, such as random access memory (RAM), read only memory (ROM), compact disk read only memory (CD-ROM), and so forth. The examples provided herein are for the purposes of illustration and should not be construed as a limitation of the techniques herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method for searching for a signal comprising:
   selecting a first bin within a range of bins, each bin corresponding to a phase of a transmitted signal;
   comparing a local reference signal, having a phase corresponding to the first bin, with a received signal, the received signal being received via a transmission medium;
   reporting whether the local reference signal matches the received signal;
   assigning weightings to the bins if the local reference signal does not match the received signal, a weighting being a priority metric and being a function of a mismatch between the local reference signal and the received signal;
   selecting a next bin according to the weightings; and
   repeating the comparing, reporting, assigning, and selecting at least until the local reference signal, having a phase corresponding to the bin selected, matches the received signal.

2. The method of claim 1 wherein the weighting is further a function of the transmission medium.

3. The method of claim 1 wherein the weighting is further based on selecting randomly and uniformly from the range of bins excluding the previously selected bin.

4. The method of claim 1 wherein the weighting is further based on an a posteriori probability.

5. The method of claim 4 further comprising updating the weightings according to the a posteriori probability.

6. The method of claim 1 further comprising updating the weightings except when a previous bin is assigned a weighting of zero.

7. The method of claim 1 wherein the weighting is further based on a fixed serial search.

8. The method of claim 1 further comprising performing at least one preliminary comparison between the local reference signal and the received signal.

9. The method of claim 1 wherein the next bin is a set of bins and performing the comparing further includes comparing the received signal with local reference signals having phases corresponding to bins in the set, the reporting further includes reporting whether at least one local reference signal matches the received signal, the assigning further includes assigning weightings to sets of bins, and the selecting further includes selecting a next set of bins.

10. An apparatus for searching for a signal comprising:
    a selecting unit configured to select a first bin within a range of bins, each bin corresponding to a phase of a transmitted signal;
    a comparing unit configured to compare a local reference signal, having a phase corresponding to the first bin, with a received signal, the received signal being received via a transmission medium;
    a reporting unit configured to report whether the local reference signal matches the received signal;
    an assigning unit configured to assign weightings to the bins if the local reference signal does not match the received signal, a weighting being a priority metric and being a function of a mismatch between the local reference signal and the received signal;
    the selecting unit further configured to select a next bin according to the weightings; and
    the comparing unit, the reporting unit, the assigning unit, and the selecting unit further configured to compare, report, assign, and select, respectively, bins at least until the local reference signal, having a phase corresponding to the bin selected, matches the received signal.

11. The apparatus of claim 10 wherein the weighting is further a function of the transmission medium.

12. The apparatus of claim 10 wherein the weighting is further based on an a posteriori probability.

13. The apparatus of claim 12 wherein the assigning unit is further configured to update the weightings according to the a posteriori probability.

14. The method of claim 1 wherein the weighting is further based on the transmission medium by determining a characteristic of the received signal.

15. The method of claim 14 wherein the characteristic of the received signal is signal strength.

16. The apparatus of claim 10 wherein the weighting is further based on selecting randomly and uniformly from the range of bins excluding the previously selected bin.

17. The apparatus of claim 10 wherein the assigning unit is further configured to update the weightings except when a previous bin is assigned a weighting of zero.

18. The apparatus of claim 10 wherein the weighting is further based on a fixed serial search.

19. The apparatus of claim 10 wherein the comparing unit is further configured to perform at least one preliminary comparison between the local reference signal and the received signal.

20. The apparatus of claim 10 wherein the next bin is a set of bins and the comparing unit, the reporting unit, the assigning unit, and the selecting unit are further configured to compare the received signal with local reference signals having phases corresponding to bins in the set, to report whether at least one local reference signal matches the received signal, to assign weightings to sets of bins, and to select a next set of bins, respectively.

21. The apparatus of claim 10 wherein the weighting is further based on the transmission medium by determining a characteristic of the received signal.

22. The apparatus of claim 21 wherein the characteristic of the received signal is signal strength.

* * * * *

UNITED STATES PATENT AND TRADEMARK OFFICE
CERTIFICATE OF CORRECTION

PATENT NO. : 8,565,690 B2
APPLICATION NO. : 11/983787
DATED : October 22, 2013
INVENTOR(S) : Watcharapan Suwansantisuk and Moe Z. Win It is certified that error appears in the above-identified patent and that said Letters Patent is hereby corrected as shown below:

In the Claims:

Column 12, Line 24, Claim 10 please delete: "bins"

Signed and Sealed this
Eighteenth Day of February, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,565,690 B2 |
| APPLICATION NO. | : 11/983787 |
| DATED | : October 22, 2013 |
| INVENTOR(S) | : Watcharapan Suwansantisuk et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this
Fourteenth Day of April, 2015

Michelle K. Lee
*Director of the United States Patent and Trademark Office*